US010680459B2

(12) United States Patent
Kanahara et al.

(10) Patent No.: US 10,680,459 B2
(45) Date of Patent: Jun. 9, 2020

(54) NON-CONTACT CHARGING SYSTEM

(71) Applicant: HONDA MOTOR CO., LTD., Tokyo (JP)

(72) Inventors: Hirokazu Kanahara, Wako (JP); Shigenori Hiruta, Wako (JP); Toshihiro Kojima, Wako (JP); Masayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

(21) Appl. No.: 15/923,649

(22) Filed: Mar. 16, 2018

(65) Prior Publication Data

US 2018/0278081 A1 Sep. 27, 2018

Related U.S. Application Data

(62) Division of application No. 14/932,209, filed on Nov. 4, 2015, now Pat. No. 10,148,119.

(30) Foreign Application Priority Data

Nov. 5, 2014 (JP) ................................ 2014-225315

(51) Int. Cl.
  *H02J 7/00* (2006.01)
  *H02J 7/04* (2006.01)
  *H02J 50/90* (2016.01)
(52) U.S. Cl.
  CPC .............. *H02J 7/042* (2013.01); *H02J 50/90* (2016.02)
(58) Field of Classification Search
  USPC ...................................................... 320/108
  See application file for complete search history.

(56) References Cited

U.S. PATENT DOCUMENTS

| 7,683,572 | B2 | 3/2010 | Toya |
| 7,795,841 | B2 | 9/2010 | Matsumoto |
| 2009/0174364 | A1 | 7/2009 | Onishi et al. |
| 2011/0115432 | A1 | 5/2011 | El-Maleh et al. |

(Continued)

FOREIGN PATENT DOCUMENTS

| JP | 2005-331331 A | 12/2005 |
| JP | 2013-70610 A | 4/2013 |

(Continued)

OTHER PUBLICATIONS

Office Action dated Aug. 16, 2016, issued in counterpart Japanese Application No. 2014-225315. (6 pages).

*Primary Examiner* — Samuel Berhanu
(74) *Attorney, Agent, or Firm* — Westerman, Hattori, Daniels & Adrian, LLP

(57) ABSTRACT

A non-contact charging system includes a power receiving device including a secondary coil, and a non-contact charger including a primary coil and a controller. The primary coil performs charging of the power receiving device through the secondary coil in a non-contact manner. Upon receiving a signal representing an abnormality of the power receiving device or detecting an abnormality of the charging in the non-contact charger, the controller stops the charging temporarily and executes procedures for restarting the charging when a first predetermined time has lapsed from the reception of the signal representing the abnormality or the detection of the abnormality of the charging.

6 Claims, 4 Drawing Sheets

(56) References Cited

U.S. PATENT DOCUMENTS

| | | |
|---|---|---|
| 2012/0212178 A1 | 8/2012 | Kim |
| 2013/0026984 A1 | 1/2013 | Yamamoto et al. |
| 2014/0167689 A1* | 6/2014 | Niizuma ................ B60L 53/60 |
| | | 320/108 |
| 2014/0191715 A1 | 7/2014 | Wechlin et al. |
| 2014/0239891 A1 | 8/2014 | Martin et al. |
| 2014/0247004 A1 | 9/2014 | Kari et al. |
| 2014/0312835 A1 | 10/2014 | Katsumata |

FOREIGN PATENT DOCUMENTS

| | | |
|---|---|---|
| JP | 2014-187775 A | 10/2014 |
| JP | 2014-193070 A | 10/2014 |
| JP | 2013/015207 A1 | 2/2015 |

* cited by examiner

NON-CONTACT CHARGING SYSTEM

CROSS-REFERENCES TO RELATED APPLICATIONS

This application is a Divisional of application Ser. No. 14/932,209, filed Nov. 4, 2015, which claims priority under 35 U.S.C. § 119 to Japanese Patent Application No. 2014-225315, filed Nov. 5, 2014, entitled "NON-CONTACT CHARGING SYSTEM." The contents of this application are incorporated herein by reference in their entirety.

BACKGROUND

1. Field

The present disclosure relates to a non-contact charging system.

2. Description of the Related Art

Hitherto, there has been a non-contact charging system including a cellular phone, as one of electronic devices, and a non-contact charger that charges the cellular phone in a non-contact manner (see, for example, Japanese Unexamined Patent Application Publication No. 2013-70610). In the non-contact charging system, when the cellular phone transmits a full charge command indicating completion of charging, the non-contact charger responsively transits to a charging stop state and then transmits a charging restart request confirmation command for confirming whether the cellular phone requests recharging.

SUMMARY

In the above-described non-contact charging system according to the related art, commands transmitted from the power receiving side and related to a request for stop of charging include not only the full charge command, but also commands corresponding to conditions that represent abnormal states detected on the power receiving side. The latter commands are specified as reason codes to issue charging stop requests in conformity with the standards for non-contact charging.

However, correspondence between the conditions that represent abnormal states detected on the power receiving side and the reason codes specified in conformity with the standards can be uniquely set by a maker manufacturing a device on the power receiving side. Accordingly, for example, when a voltage variation detected on the power receiving side and the reason code of a battery abnormality are linked with each other, a problem occurs in that the charging remains stopped continuously due to the reason code of a battery abnormality regardless of the cause of generation of the voltage variation.

In view of the above-described situations in the art, the present application proposes a non-contact charging system that is able to properly continue charging depending on a state change in charging.

The present application is constituted as follows.

(1) A non-contact charging system according to one aspect of the embodiment includes a power receiving device (e.g., a power receiving device 11 in the embodiment) including a secondary coil (e.g., a secondary coil 21 in the embodiment), and a non-contact charger (e.g., a non-contact charger 12 in the embodiment) including a primary coil (e.g., a primary coil 32 in the embodiment) that performs charging of the power receiving device through the secondary coil in a non-contact manner, and a controller (e.g., a controller 34 in the embodiment) that controls the charging in accordance with predetermined procedures including reception of signals transmitted from the power receiving device, wherein, upon receiving the signal representing an abnormality of the power receiving device or detecting an abnormality of the charging in the non-contact charger, the controller stops the charging temporarily and executes the procedures for restarting the charging when a first predetermined time has lapsed from the reception of the signal representing the abnormality or the detection of the abnormality of the charging.

With the non-contact charging system described in above (1), since the procedures for restarting the charging are started after lapse of the first predetermined time when the controller receives the signal representing the abnormality from the power receiving device or detects the abnormality in the non-contact charger, the power receiving device can be avoided from coming into a state where the charging remains stopped continuously without being noticed by a user. In the case where large vibration is generated such as when a vehicle equipped with the non-contact charger crosses a railroad (i.e., in the case where there is no abnormality in fact), the controller can restart the charging after the vibration has been settled, by setting the first predetermined time to a proper length.

(2) In the non-contact charging system described in above (1), upon receiving the signal representing full charge of the power receiving device, the controller may stop the charging temporarily and may execute the procedures for restarting the charging when a second predetermined time longer than the first predetermined time has lapsed from the reception of the signal representing the full charge.

In the case of above (2), by setting, with respect to stop of the charging attributable to the full charge, the second predetermined time longer than the first predetermined time that is set with respect to the temporary stop of the charging attributable to vibration, etc., it is possible to properly realize both earlier restart of the charging in the case of detecting a temporary abnormality, and prevention of discharge of the power receiving device after completion of the charging.

(3) In the non-contact charging system described in above (1) or (2), the controller may execute the procedures for restarting the charging a predetermined number of times.

In the case of above (3), the non-contact charging system can be brought into a charging stop state at proper timing when it is estimated with a high probability that the reception of the abnormality signal from the power receiving device or the detection of the abnormality in the non-contact charger is not temporarily generated due to vibration, etc.

(4) In the non-contact charging system described in any one of above (1) to (3), the predetermined procedures may include an operation of detecting whether the power receiving device is placed on the non-contact charger, and the procedures for restarting the charging may be executed as operations of controlling the charging in accordance with the procedures including the reception of the signals transmitted from the power receiving device even when the power receiving device being in a state placed on the non-contact charger is detected under condition that the controller receives the signal representing the abnormality of the power receiving device or detects the abnormality of the charging in the non-contact charger.

In the case of above (4), convenience in use can be improved because the charging is restarted in accordance with the procedures including the reception of the signals transmitted from the power receiving device even when the same power receiving device is continuously placed on the non-contact charger. In other words, the controller can automatically restart the charging without the necessity of a user's operation of, for example, replacing the power receiving device or turning on a power supply of the non-contact charger again.

(5) In the non-contact charging system described in any one of above (1) to (4), a vehicle equipped with the non-contact charger may have the function of detecting at least one of a shift position and an actuated state of a parking brake, and the controller may prohibit restart of the charging after the temporary stop of the charging when the controller receives the signal representing the abnormality of the power receiving device or detects the abnormality of the charging in the non-contact charger under condition that the shift position is in a position where no driving forces are transmitted to wheels, or that the parking brake is in the actuated state.

In the case of above (5), the operations for restarting the charging can be prevented from being repeated unnecessarily when it is estimated with a low probability that the reception of the abnormality signal from the power receiving device or the detection of the abnormality in the non-contact charger is temporarily generated due to vibration, etc.

(6) In the non-contact charging system described in any one of above (1) to (5), the non-contact charger may include a coil position detector (e.g., a position detector 31 in the embodiment) that detects a position of the secondary coil of the power receiving device placed on the non-contact charger, and upon receiving the signal representing the abnormality of the power receiving device or detecting the abnormality of the charging in the non-contact charger, the controller may compare a present position of the primary coil with a position of the secondary coil detected by the coil position detector, determine whether the positions of the primary coil and the secondary coil are shifted from each other, execute the procedures for restarting the charging after the first predetermined time has lapsed from the reception of the signal representing the abnormality or the detection of the abnormality of the charging when a determination result indicates that the positions of the primary coil and the secondary coil are shifted from each other, and prohibit restart of the charging after the temporary stop of the charging when a determination result indicates that the positions of the primary coil and the secondary coil are not shifted from each other.

In the case of above (6), the charging can be properly restarted when it is estimated with a high probability that the reception of the abnormality signal from the power receiving device or the detection of the abnormality in the non-contact charger is temporarily generated due to vibration, etc. Furthermore, the operations for restarting the charging can be prevented from being repeated unnecessarily when it is estimated with a low probability that the reception of the abnormality signal from the power receiving device or the detection of the abnormality in the non-contact charger is temporarily generated due to vibration, etc.

(7) In the non-contact charging system described in any one of above (1) to (6), a vehicle equipped with the non-contact charger may include a navigation device (e.g., a navigation device 15 in the embodiment) that stores map data containing at least data of railroad crossings, and that detects a position of the relevant vehicle on a map, and upon receiving the signal representing the abnormality of the power receiving device or detecting the abnormality of the charging in the non-contact charger under condition that the relevant vehicle is present within a predetermined distance from a position of any of the railroad crossings, the controller may stop the charging temporarily and execute the procedures for restarting the charging after the first predetermined time has lapsed from the reception of the signal representing the abnormality or the detection of the abnormality of the charging.

In the case of above (7), the operations for restarting the charging can be properly executed under a situation in which the necessity of restarting the charging is estimated to be high.

(8) In the non-contact charging system described in any one of above (1) to (7), the controller may detect the abnormality of the charging when a differential value resulting from comparing power output from the primary coil and power received by the secondary coil, the latter power being contained in the signals transmitted from the power receiving device, is beyond a predetermined range.

In the case of above (8), the abnormality of the charging in the non-contact charger can be detected reliably.

(9) In the non-contact charging system described in any one of above (1) to (8), the non-contact charger may be equipped in a cabin of a vehicle (e.g., a vehicle 1 in the embodiment).

In the case of above (9), in an environment where vibration occurs very often like an environment of a vehicle, the charging can be restarted properly even when the charging is stopped temporarily upon detection of an abnormality attributable to the vibration.

(10) In the non-contact charging system described in any one of above (1) to (9), the primary coil may be a movable coil that is movable depending on a position of the secondary coil of the power receiving device placed on the non-contact charger.

In the case of above (10), the position of the primary coil can be adjusted again in the subsequent procedures that are automatically executed to restart the charging, even when the power receiving device has been moved due to vibration from the position where it started the charging. As a result, the charging can be restarted in a proper state without the necessity of, for example, moving the position of the power receiving device to a proper position.

DESCRIPTION OF THE PREFERRED EMBODIMENT

A non-contact charging system according to an embodiment will be described below with reference to the accompanying drawings.

Figure 1:
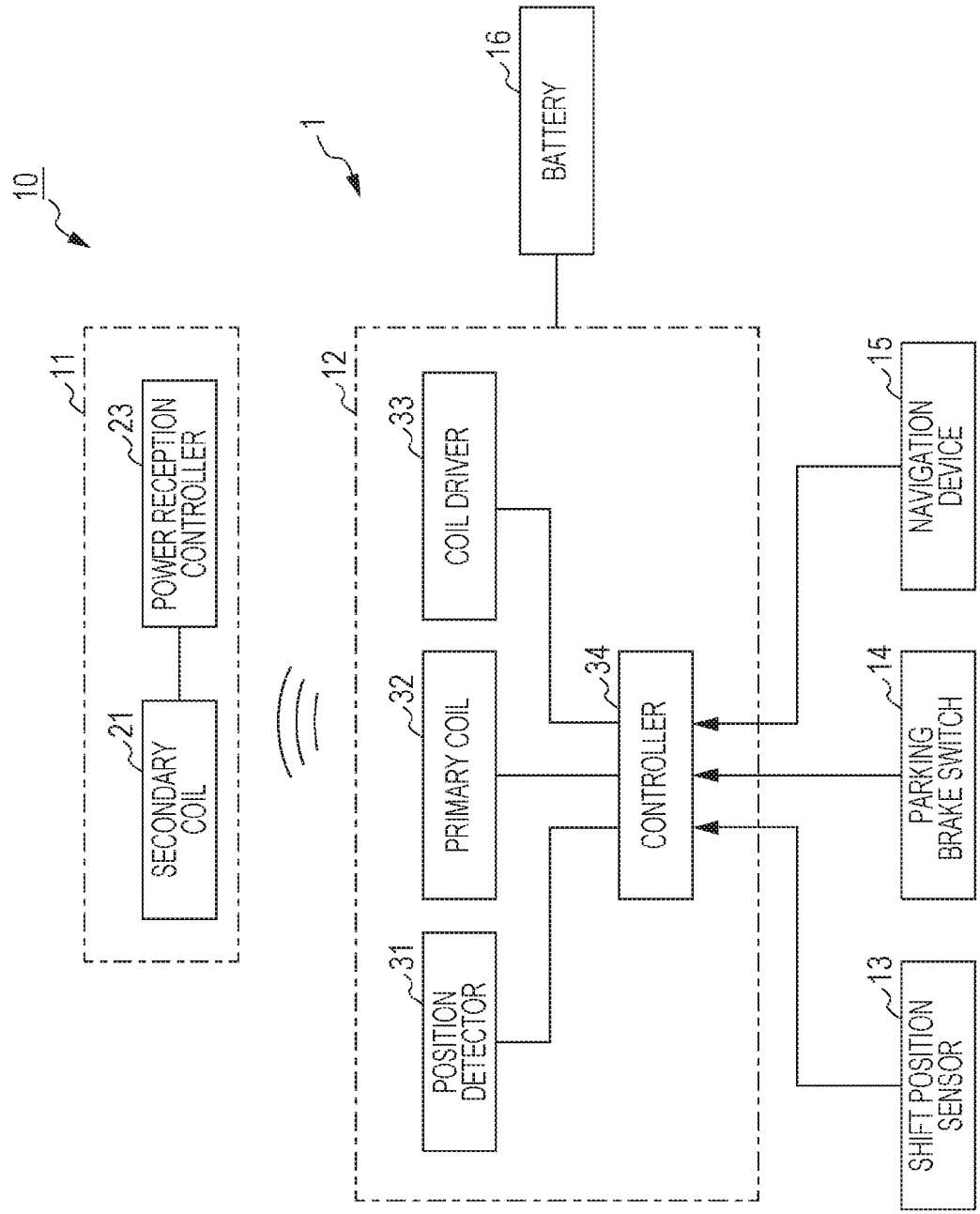
FIG. 1 is a block diagram of a non-contact charging system according to an embodiment.

As illustrated in FIG. 1, a non-contact charging system 10 according to the embodiment includes a power receiving device 11 and a non-contact charger 12. The power receiving device 11 is, for example, a portable device such as an information terminal possessed by a passenger of a vehicle 1. The non-contact charger 12 is equipped, for example, in the vehicle 1 that includes a shift position sensor 13, a parking brake switch 14, a navigation device 15, a battery 16, and so on.

The power receiving device 11 includes a secondary coil 21 and a power reception controller 23.

The secondary coil 21 generates an electromotive force through electromagnetic induction with magnetic flux generated from a later-described primary coil 32 of the non-contact charger 12.

When electric power is sent from the primary coil 32 of the non-contact charger 12 to the secondary coil 21, the power reception controller 23 changes a load of the secondary coil 21, thereby varying reflected impedance. The power reception controller 23 transmits, to the non-contact charger 12, various information signals by utilizing variations of reflected power, which are generated in the primary coil 32 of the non-contact charger 12 corresponding to the variations of the reflected impedance of the power receiving device 11. The power reception controller 23 transmits, as the various information signals, signals representing identification information specific to the power receiving device 11, received power, a charging rate, a charging stop request, abnormality information, etc. to the non-contact charger 12. The power reception controller 23 outputs the signal representing the abnormality information depending on, e.g., variations of the power received by the power receiving device 11 from the non-contact charger 12 attributable to vibration, or a decrease in the received power relative to the demanded power.

Figure 2:
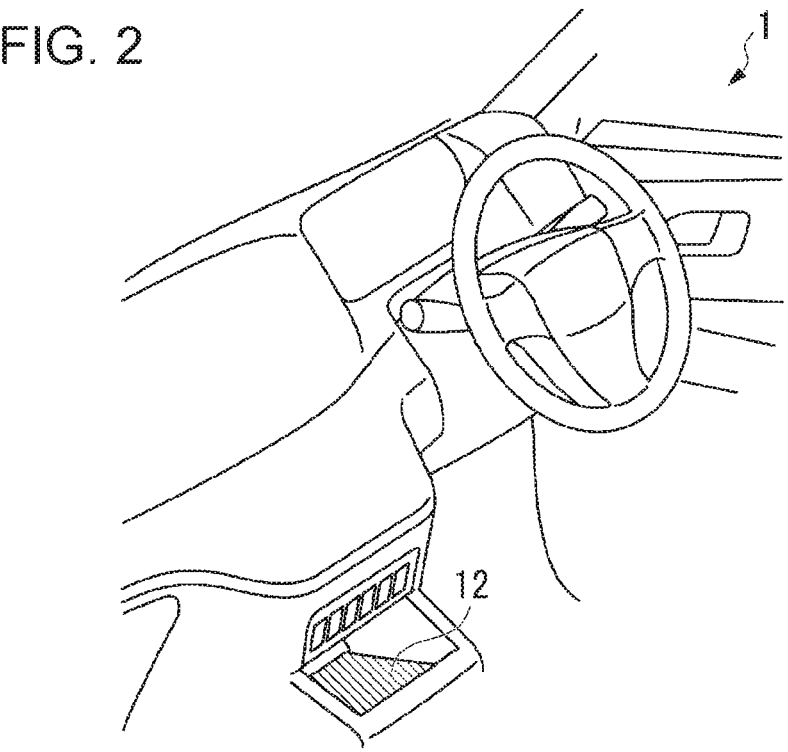
FIG. 2 is a schematic perspective view illustrating part of the interior of a vehicle equipped with a non-contact charger in the non-contact charging system according to the embodiment.

As illustrated in FIG. 2, the non-contact charger 12 is disposed in a cabin of the vehicle 1, e.g., inside a tray formed in a dashboard or a center console.

Figure 3:
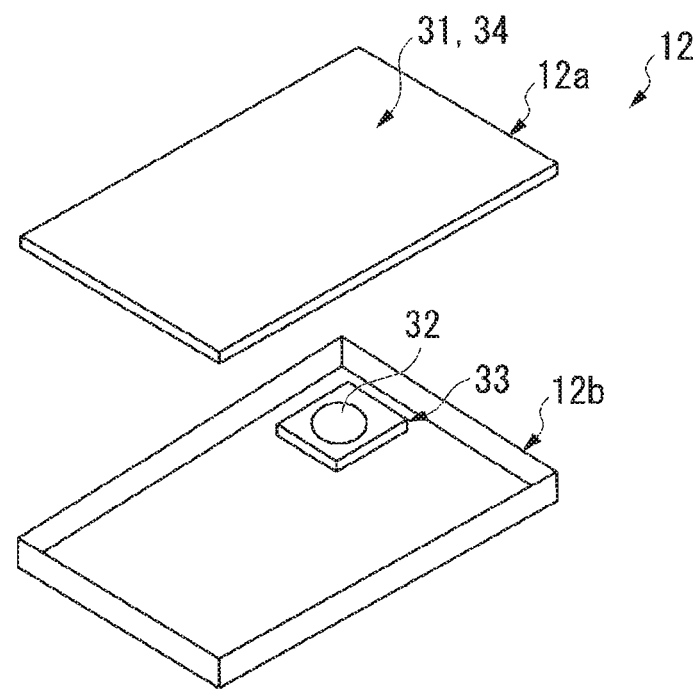
FIG. 3 is a schematic exploded perspective view of the non-contact charger in the non-contact charging system according to the embodiment.

As illustrated in FIG. 3, the non-contact charger 12 has an external configuration in the form of a rectangular plate. As illustrated in FIGS. 1 and 3, the non-contact charger 12 includes a position detector 31, a primary coil 32, a coil driver 33, and a controller 34. The position detector 31 and the controller 34 are disposed, for example, in a lid-like member 12a on which the power receiving device 11 is to be placed. The primary coil 32 and the coil driver 33 are disposed, for example, in a case-like member 12b to which the lid-like member 12a is fitted.

The position detector 31 includes a matrix coil (not illustrated) formed by detection coils that are arranged in a mesh pattern. The position detector 31 detects a position of the secondary coil 21 in a two-dimensional coordinate system on the matrix coil through communication between the detection coils and the secondary coil 21 of the power receiving device 11.

The primary coil 32 generates magnetic flux intersecting the secondary coil 21 when the primary coil 32 is supplied with electric power from the battery 16.

The coil driver 33 includes a motor, a driving mechanism, etc., which cooperatively move the primary coil 32.

The controller 34 controls the operation of the non-contact charger 12 in a supervising manner.

The controller 34 drives and control the coil driver 33 depending on the position of the secondary coil 21 detected by the position detector 31, thereby moving the primary coil 32 such that the primary coil 32 is positioned to face the secondary coil 21.

The controller 34 converts DC power output from the battery 16 to AC power, and supplies the AC power to the primary coil 32. With the supply of the power to the primary coil 32 under control of the controller 34, the magnetic flux intersecting the secondary coil 21 is generated, and an electromotive force is generated in the secondary coil 21 through electromagnetic induction with the intersecting magnetic flux. During a period in which electric power is sent from the primary coil 32 to the secondary coil 21, the controller 34 receives the various information signals that are transmitted from the secondary coil 21 by utilizing variations of the reflected power, which are generated in the primary coil 32.

In an initial state, e.g., at startup of charging, the controller 34 supplies electric power to the primary coil 32 to such an extent as substantially equivalent to that in an actual charging state, and receives the various information signals transmitted from the secondary coil 21. On the basis of both the information received from the secondary coil 21 and representing the received power and the output power of the primary coil 32, the controller 34 determines whether the intensity of the power received by the secondary coil 21 is not less than a predetermined value, thus detecting whether the power receiving device 11 is placed on the non-contact charger 12.

Upon detecting the power receiving device 11 being in a state placed on the non-contact charger 12, the controller 34 starts the actual charging after executing various processes, such as authentication on the basis of the identification information received from the secondary coil 21, and confirmation of the demanded power requested by the power receiving device 11.

During the charging, the controller 34 detects efficiency of power transmission (i.e., transmission efficiency) on the basis of a differential value resulting from comparing the information received from the secondary coil 21 and representing the received power and the output power of the primary coil 32. The controller 34 detects an abnormality of the efficiency by determining whether the detected transmission efficiency is less than a predetermined value (namely, whether the differential value between the received power and the output power is beyond a predetermined range).

Upon receiving the abnormality information from the secondary coil 21 or detecting the abnormality of the efficiency on the basis of the transmission efficiency, the controller 34 stops the charging temporarily and then executes procedures for restarting the charging when a first predetermined time has lapsed from the reception of the abnormality information or the detection of the abnormality of the efficiency. As the procedures for restarting the charging, the controller 34 supplies electric power to the primary coil 32 to such an extent as substantially equivalent to that in the actual charging state, and determines whether the various information signals transmitted from the secondary coil 21 with the supply of the power thereto are received. On the basis of both the information received from the secondary coil 21 and representing the received power and the output power of the primary coil 32, the controller 34 determines whether the intensity of the power received by the secondary coil 21 is not less than the predetermined value, thus detecting whether the power receiving device 11 is placed on the non-contact charger 12. If it is detected that the power receiving device 11 is placed on the non-contact charger 12, the controller 34 restarts the actual charging after executing the various processes, such as authentication on the basis of the identification information received from the secondary coil 21, and confirmation of the demanded power requested by the power receiving device 11.

The controller 34 executes the procedures for restarting the charging just a predetermined number of times. When the charging is not actually restarted even after executing the procedures for restarting the charging the predetermined number of times, the controller 34 maintains the charging stopped state.

When the controller 34 receives, during the charging, a signal requesting stop of the charging, which is transmitted from the secondary coil 21 in response to full charge, the controller 34 stops the charging temporarily and then executes the procedures for restarting the charging when a second predetermined time longer than the first predetermined time has lapsed from the reception of the relevant signal.

The controller 34 controls the restart of the charging in accordance with signals output from the shift position sensor 13 and the parking brake switch 14. The shift position sensor 13 outputs the signal representing a driving power transmission state (i.e., a shift position of a shift lever) of the vehicle 1. The parking brake switch 14 outputs the signal representing a state of a parking brake of the vehicle 1. Upon receiving the abnormality information from the secondary coil 21 or detecting the abnormality of the efficiency on condition that the shift position is at a position where no driving forces are transmitted to wheels, or that the parking brake is in an operating state, the controller 34 stops the charging temporarily and prohibits the restart of the charging.

The controller 34 controls the restart of the charging depending on a present position of the vehicle 1, the present position being output from the navigation device 15. The navigation device 15 stores map data containing at least data of railroad crossings, and detects a position of the relevant vehicle on a map in accordance with a positioning signal, for example. Upon receiving the abnormality information from the secondary coil 21 or detecting the abnormality of the efficiency on condition that the relevant vehicle is present within a predetermined distance from a position of any of the railroad crossings, the controller 34 stops the charging temporarily. When the first predetermined time has lapsed from the reception of the abnormality information or the detection of the abnormality of the efficiency, the controller 34 executes the procedures for restarting the charging.

Figure 4:
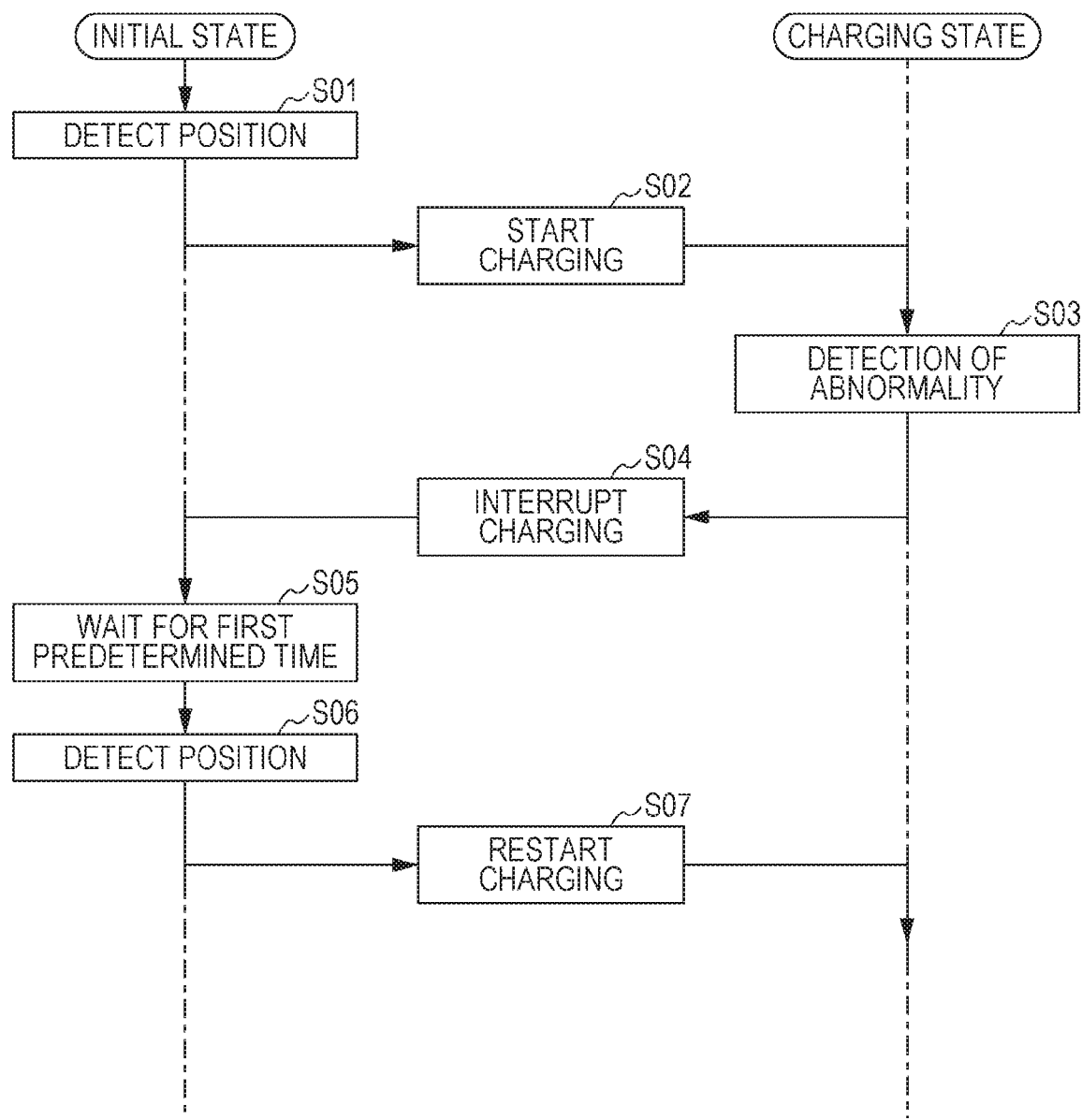
FIG. 4 is a chart illustrating flow of transitions between an initial state and a charging state in the operation of the non-contact charging system according to the embodiment.

The non-contact charging system 10 according to the embodiment is constituted as described above. One example of the operation of the non-contact charging system 10 will be described below with reference to FIG. 4.

When the non-contact charger 12 is started, for example, by turning on a power switch (not illustrated) of the non-contact charger 12, the controller 34 controls the operation of the non-contact charger 12 while transiting the non-contact charger 12 to any of multiple states including at least an initial state and a charging state.

First, in the initial state immediately after the startup, the controller 34 detects the position of the secondary coil 21 of the power receiving device 11 by the position detector 31 (step S01). Then, the controller 34 performs positioning of the primary coil 32 by driving and controlling the coil driver 33 depending on the position of the secondary coil 21.

After detecting the power receiving device 11 being in the state placed on the non-contact charger 12 and executing the various processes, such as the authentication of the power receiving device 11 and the confirmation of the demanded power, the controller 34 restarts the charging and transits the non-contact charger 12 to the charging state (step S02).

Upon detecting an abnormality during the charging (step S03), the controller 34 stops the charging temporarily and transits the non-contact charger 12 to the initial state as part of the procedures for restarting the charging (step S04). The detection of the abnormality in step S03 corresponds to the case where the controller 34 receives the information representing an abnormality of the power receiving device 11 from the secondary coil 21, or the case where the controller 34 detects the abnormality of the efficiency on the basis of the transmission efficiency in the non-contact charger 12.

The controller 34 waits in the initial state for the first predetermined time (step S05). Thereafter, the controller 34 detects, as first one of the procedures for restarting the charging, the position of the secondary coil 21 of the power receiving device 11 by the position detector 31 (step S06). Then, the controller 34 drives and controls the coil driver 33, as required, to perform positioning of the primary coil 32. Then, the controller 34 detects the power receiving device 11 being in the state placed on the non-contact charger 12 and executes the various processes, such as the authentication of the power receiving device 11 and the confirmation of the demanded power. Thereafter, the controller 34 restarts the charging and transits the non-contact charger 12 to the charging state (step S07).

With the non-contact charging system 10 according to the embodiment, as described above, since the procedures for restarting the charging are started after lapse of the first predetermined time when the controller 34 receives the signal representing an abnormality from the power receiving device 11 or detects an abnormality in the non-contact charger 12, the power receiving device 11 can be avoided from coming into a state where the charging remains stopped continuously without being noticed by a user. In the case where large vibration is generated such as when the vehicle 1 crosses a railroad (i.e., in the case where there is no abnormality in fact), the controller 34 can restart the charging after the vibration has been settled, by setting the first predetermined time to a proper length. In an environment where vibration occurs very often like an environment of the vehicle 1, the charging can be restarted properly even when the charging is stopped temporarily upon detection of an abnormality attributable to the vibration.

Furthermore, by setting, with respect to stop of the charging attributable to full charge of the power receiving device 11, the second predetermined time to be longer than the first predetermined time that is set with respect to the temporary stop of the charging attributable to vibration, etc., it is possible to properly realize both earlier restart of the charging in the case of detecting a temporary abnormality, and prevention of discharge of the power receiving device 11 after completion of the charging.

Moreover, by limiting the number of times of repeatedly executing the procedures for restarting the charging to a predetermined value, the non-contact charging system can be brought into the charging stop state at proper timing when it is estimated with a high probability that the reception of the abnormality signal from the power receiving device 11 or the detection of the abnormality in the non-contact charger 12 is not temporarily generated due to vibration, etc.

In addition, convenience in use can be improved because the charging is restarted in accordance with the procedures including the reception of the signals transmitted from the power receiving device 11 even when the same power receiving device 11 is continuously placed on the non-contact charger 12 after the charging has been stopped temporarily. In other words, the controller 34 can automatically restart the charging without the necessity of a user's operation of, for example, replacing the power receiving device 11 or turning on the power supply of the non-contact charger 12 again.

The operations for restarting the charging can be prevented from being repeated unnecessarily when it is estimated with a low probability that the reception of the abnormality signal from the power receiving device 11 or the detection of the abnormality in the non-contact charger 12 is temporarily generated due to vibration, etc., as in the state where no driving forces are transmitted to the wheels or where the parking brake is actuated.

The operations for restarting the charging can be properly executed under a situation in which the necessity of restarting the charging is estimated to be high as in the state where the position of the relevant vehicle is present within a predetermined distance from the position of a railroad crossing.

Since an abnormality of the charging is detected on the basis of the result of comparison between the power output from the primary coil 32 and the power received by the secondary coil 21, the abnormality of the charging in the non-contact charger 12 can be detected reliably.

Since the primary coil 32 is constituted as a movable coil, the position of the primary coil 32 can be adjusted again in the subsequent procedures that are automatically executed to restart the charging, even when the power receiving device 11 has been moved due to vibration from the position where it started the charging. As a result, the charging can be restarted in a proper state without the necessity of, for example, moving the position of the power receiving device 11 to a proper position.

A modification of the above-described embodiment will be described below.

In the above-described embodiment, upon receiving the abnormality information from the secondary coil 21 or detecting the abnormality of the efficiency on the basis of the transmission efficiency, the controller 34 stops the charging temporarily, detects the position of the secondary coil 21 of the power receiving device 11 by the position detector 31, and then restarts the charging. However, the present application is not limited to the above-described embodiment.

Figure 5:
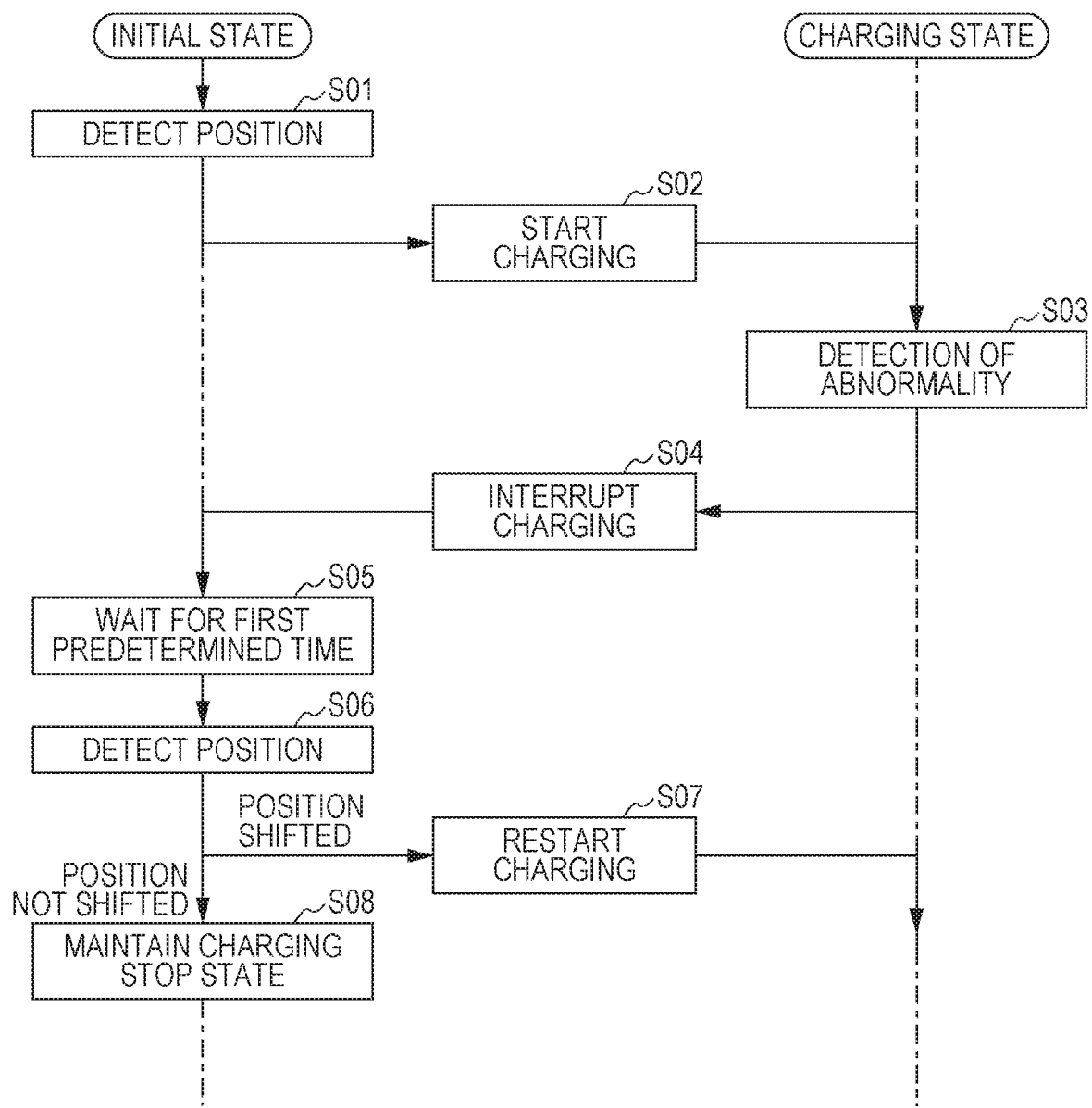
FIG. 5 is a chart illustrating flow of transitions between an initial state and a charging state in the operation of a non-contact charging system according to a modification of the embodiment.

As illustrated in FIG. 5, the controller 34 may change the procedures such that, after stopping the charging temporarily, whether the charging is to be restarted is selected depending on the position of the secondary coil 21 of the power receiving device 11 detected by the position detector 31. The controller 34 restarts the charging (step S07) when the position of the secondary coil 21 of the power receiving device 11 is shifted, namely when the position of the secondary coil 21 detected by the position detector 31 in the initial state immediately after the startup is different from the position of the secondary coil 21 of the power receiving device 11, the latter position being detected by the position detector 31 in the initial state after stopping the charging temporarily, beyond a predetermined range. On the other hand, the controller 34 maintains the stop of the charging (step S08) when the position of the secondary coil 21 of the power receiving device 11 is not shifted, namely when the position of the secondary coil 21 detected by the position detector 31 in the initial state immediately after the startup is matched with the position of the secondary coil 21 of the power receiving device 11, the latter position being detected by the position detector 31 in the initial state after stopping the charging temporarily, within the predetermined range.

According to the modification, the charging can be properly restarted when it is estimated with a high probability that the reception of the abnormality information from the secondary coil 21 or the detection of the abnormality of the efficiency in the non-contact charger 12 is temporarily generated due to vibration of the vehicle 1, etc. (namely, when the position of the secondary coil 21 is shifted). Furthermore, the operations for restarting the charging can be prevented from being repeated unnecessarily when it is estimated with a low probability that the reception of the abnormality information from the secondary coil 21 or the detection of the abnormality of the efficiency in the non-contact charger 12 is temporarily generated due to vibration of the vehicle 1, etc. (namely, when the position of the secondary coil 21 is not shifted). As a result, the restart of the charging can be prohibited in the event of an abnormality, for example, that a foreign matter is caught between the power receiving device 11 and the non-contact charger 12.

While, in the above-described embodiment, the non-contact charger 12 is of the so-called moving coil type in which the primary coil 32 is constituted as a movable coil, the present application is not limited to the above-described constitution.

The non-contact charger 12 may be, for example, of the multi-coil type including a plurality of primary coils 32, or the magnet type moving the power receiving device 11 and the secondary coil 21 by a permanent magnet, instead of the moving coil type.

The embodiment of the present disclosure is disclosed merely illustrative and is not intended to limit the scope of the disclosure. The embodiment can be practiced in other various forms, and various omissions, replacements, and alterations can be made on the embodiment within the range not departing from the gist of the disclosure. Those various embodiments and modifications are involved within not only the scope and the gist of the disclosure, but also the range regarded as equivalent to the disclosure defined in Claims.

What is claimed is:

1. A non-contact charging system comprising:
  a power receiving device comprising a secondary coil; and
  a non-contact charger which comprises,
  a primary coil that applies a magnetic flux to the secondary coil of power receiving device for charging of the power receiving device in a non-contact manner, and
  a controller configured to control the charging of the power receiving device in accordance with predetermined procedures including receiving signals transmitted from the power receiving device, starting the charging, stopping the charging and restarting charging in a controlled manner,
  wherein the controller is configured to,
  (1) stop the charging temporarily upon receiving a signal from the power receiving device representing an abnormality of the power receiving device or upon detecting an abnormality of the charging in the non-contact charger, and
  (2) then restart the charging when a first predetermined time has lapsed after procedure (1),
  wherein the non-contact charger is provided to a vehicle which comprises a navigation device that stores data of a map containing at least railroad cossing locations and that detects a position of the vehicle on the map, and
  the controller executes procedures (1) and (2) under conditions that the navigation device detects the location of the vehicle within a predetermined distance from any of the railroad crossing locations on the map.

2. The non-contact charging system according to claim 1, wherein upon receiving a signal from the power receiving device representing full charge thereof, the controller stops the charging temporarily and then restarts the charging when a second predetermined time which is longer than the first predetermined time has lapsed from the reception of the signal representing the full charge.

3. The non-contact charging system according to claim 1, wherein the controller is configured to repeat the procedures (1) and (2) defined in claim 1 a predetermined number of times and then stop the repeating procedure.

4. The non-contact charging system according to claim 1, wherein the controller is further configured to determine whether the power receiving device is continuously placed on the non-contact charger, thereby being in a state capable of the charging, and the controller executes the procedures (1) and (2) defined in claim 1 even when the controller determines that the power receiving device is in the state capable of the charging.

5. The non-contact charging system according to claim 1, wherein the signals transmitted from the power receiving device to the controller comprise a signal representing a power received by the secondary coil, and the controller compares the power output from the primary coil and the power received by the secondary coil and determines that an abnormality of the charging occurs when a differential value resulting from comparing the power output from the primary coil and the power received by the secondary coil is beyond a predetermined range, and the controller executes the procedures (1) and (2) defined in claim 1 when the occurrence of the abnormality of the charging is detected.

6. The non-contact charging system according to claim 1, wherein the non-contact charger is equipped in a vehicle cabin.

* * * * *